US009453549B2

United States Patent
Marvuglio et al.

(10) Patent No.: US 9,453,549 B2
(45) Date of Patent: Sep. 27, 2016

(54) GAP-TYPE, SINGLE TURN, TOOLED WAVE SPRING

(71) Applicant: Rotor Clip Company, Inc., Somerset, NJ (US)

(72) Inventors: David G. Marvuglio, Bridgewater, NJ (US); Elmar Joerg Kampmann, Senden (DE)

(73) Assignee: Rotor Clip Company, Inc., Somerset, NJ (US)

( * ) Notice: Subject to any disclaimer, the term of this patent is extended or adjusted under 35 U.S.C. 154(b) by 0 days.

(21) Appl. No.: 14/761,494

(22) PCT Filed: Jan. 10, 2014

(86) PCT No.: PCT/US2014/011011
§ 371 (c)(1),
(2) Date: Jul. 16, 2015

(87) PCT Pub. No.: WO2014/113283
PCT Pub. Date: Jul. 24, 2014

(65) Prior Publication Data
US 2015/0362036 A1    Dec. 17, 2015

Related U.S. Application Data

(60) Provisional application No. 61/753,579, filed on Jan. 17, 2013.

(51) Int. Cl.
*F16F 1/34* (2006.01)
*F16F 1/32* (2006.01)

(52) U.S. Cl.
CPC .......... *F16F 1/328* (2013.01); *F16F 2238/022* (2013.01)

(58) Field of Classification Search
CPC .......... F16F 1/048; F16F 1/328; F16F 1/027; F16F 1/26; F16F 1/18; F16F 1/32
USPC .................................. 267/158–165
See application file for complete search history.

(56) References Cited

U.S. PATENT DOCUMENTS

| | | | |
|---|---|---|---|
| 5,960,923 A | 10/1999 | Araki | |
| 6,250,618 B1 * | 6/2001 | Greenhill | F16F 1/027 267/160 |

(Continued)

FOREIGN PATENT DOCUMENTS

| | | | | |
|---|---|---|---|---|
| DE | 102010029309 A1 * | 12/2011 | | F16B 21/183 |
| JP | 2000274468 A | 10/2000 | | |
| JP | 2005248983 A * | 9/2005 | | |

(Continued)

OTHER PUBLICATIONS

Machine translation of JP 2005248983 (no date).*

(Continued)

*Primary Examiner* — Nicholas J Lane
(74) *Attorney, Agent, or Firm* — Norris McLaughlin & Marcus, P.A.

(57) ABSTRACT

A flat wire, gap-type, single turn wave spring made using a coiling manufacturing process. The portions of the spring adjacent the gap are made flat so that they can glide smoothly along a mating surface without causing damage to the surface.

7 Claims, 3 Drawing Sheets

(56) References Cited

U.S. PATENT DOCUMENTS

| | | |
|---|---|---|
| 6,254,071 B1 | 7/2001 | Greenhill |
| 2014/0048991 A1* | 2/2014 | Doetterl .................. F16F 1/328 267/161 |

FOREIGN PATENT DOCUMENTS

| | | | |
|---|---|---|---|
| JP | WO 2013137242 A1 * | 9/2013 | ............. F16F 1/328 |
| WO | 99/29548 A1 | 6/1999 | |

OTHER PUBLICATIONS

Abstract of DE 102010029309 (no date).*

International Search Report for Application No. PCT/EP2014/011011 dated May 9, 2014.

International Preliminary Report on Patentability for Application No. PCT/EP2014/011011 dated Jul. 30, 2015.

* cited by examiner

GAP-TYPE, SINGLE TURN, TOOLED WAVE SPRING

This application is a 371 application of PCT/US2014/011011 filed Jan. 10, 2014, which claims the benefit under 35 U.S.C. 119(e) of U.S. Provisional Patent Application No. 61/753,597, filed on Jan. 17, 2013, which is incorporated herein by reference in its entirety.

Field of the Disclosure

A flat wire, gap-type, single turn wave spring made using a coiling manufacturing process wherein the portions of the spring adjacent the gap are made flat. The flat portions are configured to abut a mating assembly.

The Related Art

Flat wire and round wire wave springs and their methods of manufacture are known in the art. A single turn round wire wave spring is described in U.S. Pat. No. 6,254,0971. A coiled flat wire wave spring is illustrated in Japanese publication No. JP 2000274468A.

Presently known flat wire, gap-type, single turn wave springs have sharp corners in the cut ends at the gap that can damage the mating parts of an assembly. As these prior art wave springs are made taller, with increased height, the problem of damage is made worse.

SUMMARY OF THE DISCLOSURE

The improvement of the present invention is in the flattening of the portions of the spring adjacent the gap. The flat portions, herein the "flats", glide smoothly along the surface of the mating assembly.

DESCRIPTION OF THE DISCLOSURE

Figure 1:
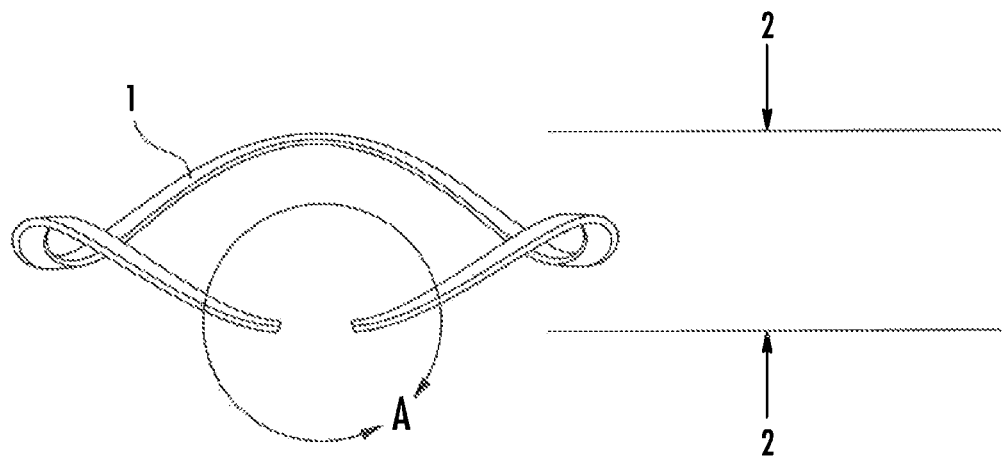
FIG. 1 illustrates, in elevation, a known wave spring.

The wave spring of the present invention has only a single turn about a central axis. The single turn is formed from a length of flat wire that is wound in the shape of a portion of a circle on a predetermined radius for an arc length of less than 360°. The flat wire length for each spring has a rectangular cross-section for the entire length of the arc and the cross-section is preselected and constant. The width of the flat wire is also constant for each spring. The flat wire has a predetermined length and it terminates in two free ends which are separated from each other by an intervening gap. Preferably, the two free ends are axially aligned with each other along the length of the flat wire. Each of the two free ends have flattened portions which are perpendicular or radial to the central axis and are configured to slide smoothly along a working element when the wave spring is used in a spring application. In other words, the tips or sharp edges of the free ends do not contact the mating surface in a manner which causes them to scratch or dig into the mating surface. Instead, the flattened portions of the free end are in contact with the mating surface.

A plurality of waves is formed along the length of the flat wire and each of the waves have opposing crest and trough portions which define respective first and second working surfaces on opposite surfaces of the wave spring. The gap may be disposed on the flat wire length between adjacent crests and troughs of a wave or on a crest or trough of a wave. The first working surface contacts a first working element and this surface is associated with the crests of the waves. The second working surface is associated with the wave troughs. The mating surface referenced above, which comes into contact with the flattened portions, can be either the first working surface or the second working surface.

The wave spring has a free height which is equal to the distance between the crests and troughs in the absence of loading of the wave spring. The gap has a length sufficiently large to permit the free ends to move toward each other without touching each other when the wave spring is compressed from its undeflected free height to a lesser height in response to loading by either the first or second or both of the working elements. It is also understood that in some applications the spring may be in contact with a constraining diameter when the spring clings in a housing or on a shaft.

The waves of the wave spring can be made to define curves which are suitable to the application for the spring. For example, the waves may define a substantially sinusoidal curve or another curve or combination thereof as is known in the art.

The free ends of the flattened portion can be axially aligned with each other along a flat wire length. And the gap can be disposed on the flat wire length between adjacent crests and troughs of one of the waves or on one of a crest or trough of one of the waves. The location of the gap relative to the waves is predetermined depending upon the desired application for the spring. The crests and troughs may be equidistant from each other or not, consistent with the desired design characteristics. The number of waves and crests is selected on the same basis.

Figure 1A:
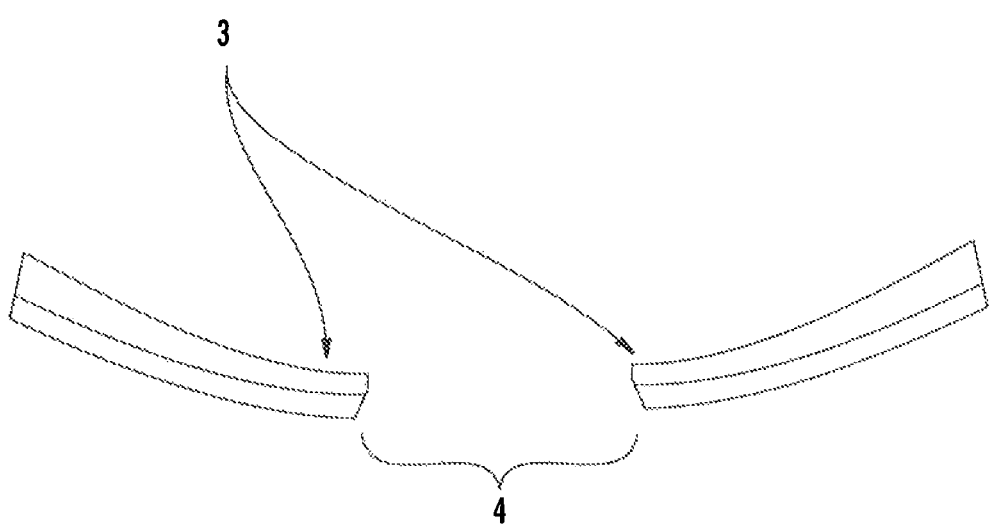
FIG. 1A is an enlarged view of a portion of the known wave spring encircled in FIG. 1 by A.

FIG. 1 illustrates in elevation a prior art wave spring 1 wherein the height of the spring is illustrated by the space between the lines designated by arrows 2-2. FIG. 1A is an enlarged view of the portion of the spring 1 encircled in FIG. 1 by A. FIG. 1A highlights the sharp edges 3 on each side of the gap 4. As can be seen from FIGS. 1 and 1A, the sharp edges 3 are at the ends of spring portions that follow the contour of the spring 1. The bottom portions of the sharp edges 3 contact a mating surface.

When prior art spring 1 is compressed, the bottom portions of the sharp edges 3 move toward one another and scratch or dig into the mating surface. More scratching occurs as the compression is released (e.g., when dynamic cycling of the spring applies). This creates debris from portions of the mating surface and/or the spring that come off as a result of scratching and/or digging. As the spring is made taller, the edges 3 are at a greater angle of inclination relative to the mating surface and therefore tend to cause more damage to the mating surface and the spring. Ultimately, the spring may fail because the damaged mating surface will negatively influence the spring characteristics, and/or the mating surface will need to be smoothed by machining or other means. There could also be a need to modify the edges 3 of the spring by machining or deburring to reduce damage caused by the edges 3.

Figure 2:
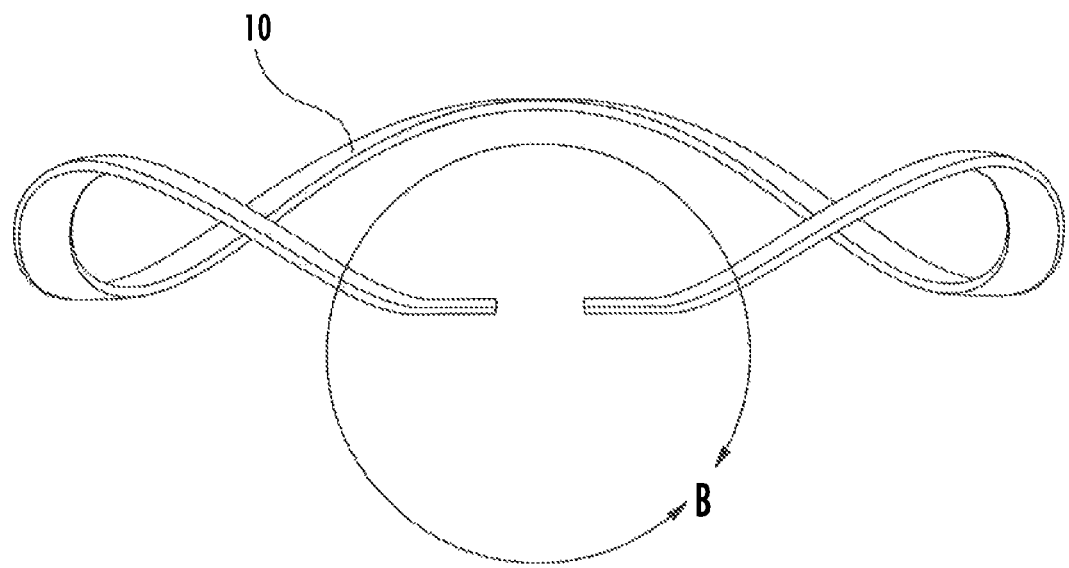
FIG. 2 illustrates, in elevation, an improved wave spring of the present disclosure in an embodiment.
Figure 2A:
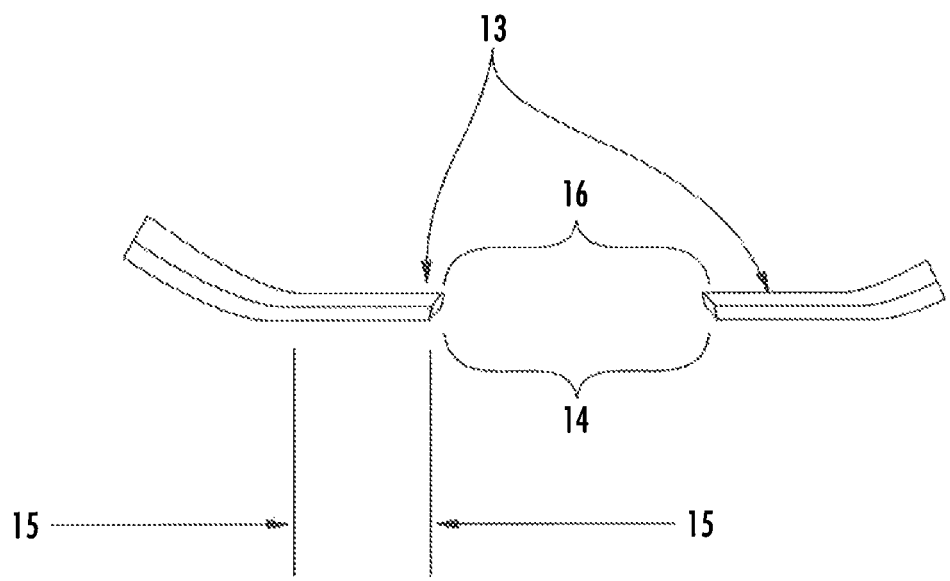
FIG. 2A is an enlarged view of a portion of the improved wave spring of the present disclosure encircled in FIG. 2 by B in an embodiment.

FIG. 2 illustrates in elevation the improved wave spring 10 of the invention. FIG. 2A is an enlarged view of the portion of the spring of the invention encircled in FIG. 2 by B. FIG., 2A highlights the flats 13. The lengths of the flats are illustrated by the space between the lines designated by arrows 15. In a preferred embodiment, the length of the flats is greater than the width 16 of the spring wire. (See FIG. 3.) As spring 10 is compressed, the gap 14 becomes smaller as the flats 13 glide smoothly toward one another along the mating surface. The flats also glide smoothly along the mating surface as the compression is released. The height of the spring 10 doesn't matter because the flats 13 are made to rest on the mating surface in a manner that does not allow the edges to dig into the mating surface. In a preferred embodiment, the flats 13 lie flat against the mating surface when spring 10 is not under compression.

Figure 3:
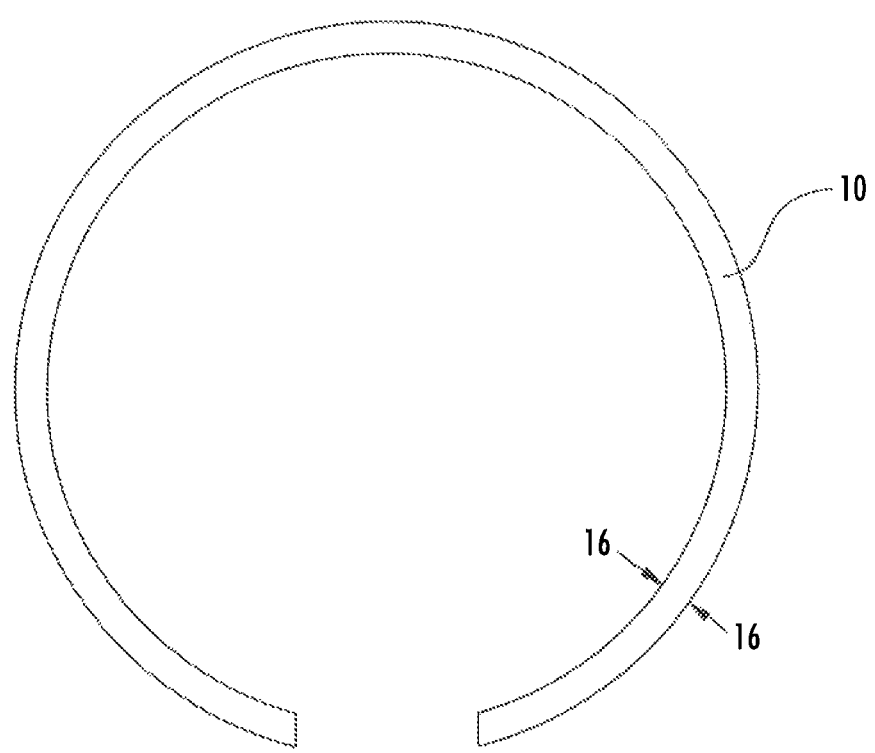
FIG. 3 is a top view of the improved wave spring in an embodiment.

FIG. 3 is a top view of spring 10 illustrating the width 16 of the spring wire.

We claim:

1. A wave spring, comprising:
a spring having only a single turn about a central axis, the single turn being formed from a length of flat wire that is wound in a circle on a predetermined radius for an arc length of less than 360 degrees, the flat wire length having a rectangular cross-sectional configuration for its entire arc length, said flat wire length further terminating in two free ends which are separated from each other by an intervening gap, each of the two free ends having flattened portions, the flattened portions being perpendicular to the central axis, said flat wire length further having a plurality of waves formed therein, each of the waves having opposing crest and trough portions defining respective first and second working surfaces on opposite surfaces of said wave spring for respectively contacting first and second working elements when said wave spring is used in a spring application, the first working surfaces being associated with said wave crests and said second working surfaces being associated with said wave troughs, said wave spring having a free height which is equal to the distance between said crests and troughs in the absence of loading of said wave spring, said intervening gap being of a length sufficiently large to permit said flat wire length free ends to move toward each other without touching each other when said wave spring is compressed from its undeflected free height to a lesser height in response to loading by either of said first and second working elements, said flat wire free ends being at the ends of flattened portions of the wave spring, the flattened portions configured to abut the first or second working elements.

2. The wave spring of claim 1 wherein the rectangular cross-secitonal configuration has a constant, preselected cross-sectional area.

3. The wave spring of claim 1 wherein said waves define a substantially sinusoidal curve.

4. The wave spring of claim 1 wherein said two free ends are axially aligned with each other along said flat wire length.

5. The wave spring of claim 4 wherein said intervening gap is disposed on said flat wire length between adjacent crests and troughs of one of said plurality of said waves.

6. The wave spring of claim 4 wherein said intervening gap is disposed on one of a crest or trough of one of said plurality of waves.

7. The wave spring of claim 1 wherein said crests and troughs are spaced approximately equidistant from each other.

* * * * *